US008279181B2

(12) United States Patent
Kanno

(10) Patent No.: US 8,279,181 B2
(45) Date of Patent: Oct. 2, 2012

(54) POINTING DEVICE

(75) Inventor: Hiroshi Kanno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 944 days.

(21) Appl. No.: 11/727,181

(22) Filed: Mar. 23, 2007

(65) Prior Publication Data

US 2007/0296698 A1    Dec. 27, 2007

(30) Foreign Application Priority Data

Jun. 23, 2006   (JP) .................................. 2006-174455

(51) Int. Cl.
- G09G 5/00   (2006.01)
- G09G 5/08   (2006.01)
- G06F 3/033  (2006.01)
- G06F 3/041  (2006.01)

(52) U.S. Cl. ......... 345/173; 345/156; 345/158; 345/166

(58) Field of Classification Search .................. 345/158, 345/173–179, 166
See application file for complete search history.

(56) References Cited

U.S. PATENT DOCUMENTS

| | | | | |
|---|---|---|---|---|
| 5,691,747 | A * | 11/1997 | Amano ......................... | 345/167 |
| 6,300,940 | B1 * | 10/2001 | Ebina et al. ..................... | 345/161 |
| 6,408,087 | B1 * | 6/2002 | Kramer ........................... | 382/124 |
| 6,424,338 | B1 * | 7/2002 | Anderson ..................... | 345/173 |
| 6,466,202 | B1 * | 10/2002 | Suso et al. ..................... | 345/169 |
| 6,879,316 | B2 * | 4/2005 | Kehlstadt et al. ............. | 345/163 |
| D558,792 | S  * | 1/2008 | Chigira ......................... | D14/496 |
| 2001/0007449 | A1 * | 7/2001 | Kobachi et al. ............... | 345/156 |
| 2002/0135565 | A1 | 9/2002 | Gordon et al. | |
| 2002/0155857 | A1 * | 10/2002 | Nishimoto ..................... | 455/550 |
| 2004/0164954 | A1 * | 8/2004 | Rekimoto ..................... | 345/156 |
| 2005/0024326 | A1 * | 2/2005 | Betts-LaCroix et al. ..... | 345/156 |
| 2006/0066587 | A1 * | 3/2006 | Morohoshi et al. ........... | 345/173 |
| 2006/0238517 | A1 * | 10/2006 | King et al. .................... | 345/173 |
| 2008/0158164 | A1 * | 7/2008 | Lee ................................ | 345/173 |

FOREIGN PATENT DOCUMENTS

| | | |
|---|---|---|
| JP | 5-303468 | 11/1993 |
| JP | 9-179687 | 7/1997 |
| JP | 9-230995 | 9/1997 |
| JP | 2002-318661 | 10/2002 |
| JP | 2002-366297 | 12/2002 |
| JP | 2003-44216 | 2/2003 |
| JP | 2004-199361 | 7/2004 |

OTHER PUBLICATIONS

Japanese Office Action issued Jan. 11, 2011 in corresponding Japanese Patent Application 2006-174455.

* cited by examiner

*Primary Examiner* — Bipin Shalwala
*Assistant Examiner* — Benyam Ketema
(74) *Attorney, Agent, or Firm* — Staas & Halsey LLP

(57) ABSTRACT

A pointing device includes a movement detector adapted to detect movement of an operating object, a pressure detector adapted to detect an operating pressure of the operating object, and a controller adapted to direct movement of a target object, wherein the controller controls the moving direction of the target object in accordance with the detected movement of the operating object and controls the moving speed of the target object in accordance with the operating pressure detected when the operating object is moving.

5 Claims, 15 Drawing Sheets

FIG. 5

| STATE | PRESSURE | POWER | LIGHT EMITTING UNIT |
|---|---|---|---|
| CLOSED 501 | NOT-PRESSED 502 | OFF503 | OFF504 |
| OPEN 500 | NOT-PRESSED 507 | ON505 | OFF508 |
| | PRESSED 509 | ON506 | ON510 |

POINTING DEVICE

BACKGROUND OF THE INVENTION

1. Field of the Invention

The present invention relates to a pointing device to direct movement of a target object.

2. Description of the Related Art

A technique to direct movement of an object is used in various apparatus such as a remote control device adapted to remotely control movement of a moving object, an input device such as a pointing device used in an information processing apparatus to direct movement of an object such as a pointer displayed on a display screen, etc. An input device to direct movement on a display screen is used in a wide variety of apparatus such as personal computers, portable telephone devices, PDA devices, portable game machines, etc. Such an input device allows a user to direct movement of an object of an image such as a cursor or a pointer displayed on a display screen, for example, to move the object in a drag-and-drop manner. In input devices for this purpose, it is desirable that they have a small size and besides they be flexibly and freely operable.

Many types of input devices for the above purpose are known. However, it is not easy to satisfy both requirements for small size and flexible operability. In general, a mouse is excellent in operability but it is difficult to realize a small-sized mouse. On the other hand, input devices such as joysticks, trackballs and cursor keys are not good in operability. More specifically, operability of these input devices is not good enough in that it is not easy to finely indicate a moving direction, a moving distance, and/or a moving speed of an object. It is also difficult for these types of devices to quickly direct long-distance movement. These difficulties can cause users not to be allowed to control movement of an object precisely in a manner intended by users in various situations.

Japanese Unexamined Patent Application Publication No. 2002-318661 discloses a pointing device with a new feature. In the pointing device disclosed in Japanese Unexamined Patent Application Publication No. 2002-318661, it is allowed to specify the ratio of the moving distance of an object such as a cursor to the moving distance of a user's finger so that it is possible to finely control the movement of the cursor. However, if the ratio is specified in such a manner, it becomes necessary to move the finger a greater distance, and thus it becomes necessary for the pointing device to have a greater operation area. Conversely, if the pointing device is configured to be capable of directing large-distance movement with a small operation area, the result is necessity of a plurality of scrolling operations and/or low operation sensitivity. Any way, such a configuration results in low operability.

SUMMARY OF THE INVENTION

In view of the above, it is an object of the present invention to realize a pointing device meeting both requirements for small size and high operability.

More specifically, the present invention provides a pointing device comprising a movement detector adapted to detect movement of an operating object, a pressure detector adapted to detect an operating pressure of the operating object, and a controller adapted to direct movement of a target object, wherein the controller controls the moving direction of the target object in accordance with the detected movement of the operating object and controls the moving speed of the target object in accordance with the operating pressure detected when the operating object is moving.

The pointing device according to the present invention has the great advantage that the pointing device can be realized in a small form and it is allowed to control the target object precisely according to user's intention by detecting the movement of the operating object and the operating pressure of the operating object.

BRIEF DESCRIPTION OF THE DRAWINGS

FIG. 5 shows a power control table according to an embodiment of the present invention;

DESCRIPTION OF THE PREFERRED EMBODIMENTS

The present invention is described in further detail below with reference to specific embodiments.

According to an embodiment of the present invention, a pointing device includes a movement detector adapted to detect movement of an operating object, a pressure detector adapted to detect an operating pressure of the operating object, and a controller adapted to direct movement of a target object. The controller controls the movement of the target object according to a control program such that the moving direction of the target object is controlled in accordance with the movement of the operating object detected by the movement detector, and the moving speed of the target object is controlled in accordance with the operation pressure detected by the pressure detector when the operating object is moving.

First Embodiment

A technique according to a first embodiment is disclosed below in which inputting is performed using an optical input unit 116 and a pressure-sensitive input unit 117.

Figure 1:
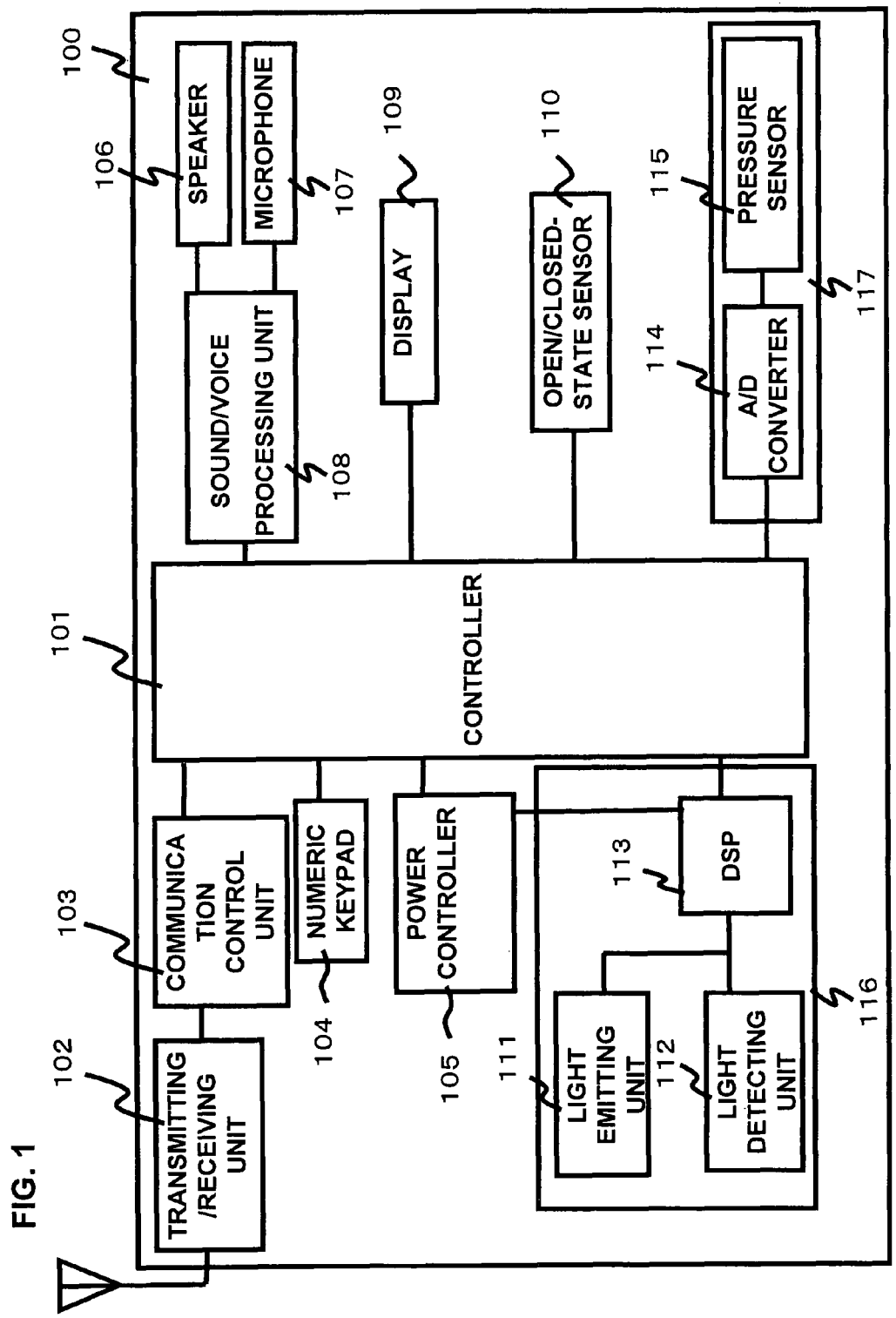
FIG. 1 is a hardware block diagram of an information processing apparatus according to an embodiment of the present invention.

FIG. 1 is a hardware block diagram of an information processing apparatus 100 according to an embodiment of the present invention.

The information processing apparatus 100 includes a controller 101, a transmitting/receiving unit 102, a communication control unit 103, a numeric keypad 104, a power controller 105, a speaker 106, a microphone 107, a sound/voice processing unit 108, a display 109, an open/closed-state sensor 110, a light emitting unit 111, a light detecting unit 112, a DSP (Digital Signal Processor) 113, an A/D converter 114, and a pressure sensor 115.

In the present embodiment, it is assumed, by way of example, that the information processing apparatus 100 is a portable telephone device (and thus, hereinafter, the information processing apparatus 100 is referred to as a portable telephone device 100). Furthermore, the portable telephone device 100 is assumed to be of a folding type.

The controller 101 is realized by a computer including a CPU (Central Processing Unit), a ROM (Read-Only Memory), and a RAM (Random-Access Memory). The controller 101 generally controls processes performed in the portable telephone device 100. The controller 101 controls processes by executing a control program stored in the ROM disposed in the controller 101. The control program does not necessarily need to be stored in the ROM, but it may be stored in another storage medium similar to the ROM.

The transmitting/receiving unit 102 transmits and/or receives radio signal wave via an antenna. The communication control unit 103 modulates a carrier signal with a communication signal or a dial signal and demodulates a received signal.

The numeric keypad 104 is used to input a telephone number or a mail address. The numeric keypad 104 is also used to call various functions of the portable telephone device 100 and input commands associated with called functions. Although not shown in FIG. 1, in addition to the numeric keypad, the portable telephone device 100 also has keys such as a communication start key, a communication end key, function keys, and arrow keys.

The power controller 105 controls turning-on/off of electric power of the portable telephone device 100. The control of turning-on/off of the power is performed in response to opening or closing (folding) of the portable telephone device 100, which is detected by the open/closed-state sensor 110 as will be described later. When the open/closed-state sensor 110 detects that the portable telephone device 100 is in the open state, the power is turned on. On the other hand, when open/closed-state sensor 110 detects that the portable telephone device 100 is in the closed state, the power is turned off. Note that when the open state is detected by the open/closed-state sensor 110, the power controller 105 controls the power depending on whether a pressure is detected by the pressure sensor 115. More specifically, when the pressure sensor 115 does not sense a pressure within a predetermined time period after the open state is detected by the open/closed-state sensor 110, no electric power is supplied to the light emitting unit 111. On the other hand, in a case in which a pressure was sensed by the pressure sensor 115, electric power is supplied to the light emitting unit 111.

The sound/voice processing unit 108 is connected to the speaker 106 and the microphone 107. The sound/voice processing unit 108 converts an analog sound/voice signal detected by the microphone 107 into a digital signal and converts a digital sound/voice signal output from the controller 101 into an analog signal. The speaker 106 reproduces a sound/voice in accordance with a sound/voice signal output from the controller 101 or a sound/voice signal detected by the microphone 107.

The display 109 is realized, for example, by an LCD (Liquid Crystal Display) and serves to display various kinds of input/output information.

The open/closed-state sensor 110 detects whether the portable telephone device 100 is in the open state or closed state. When the portable telephone device 100 is in the open state, a user is allowed to operate the portable telephone device 100 to make a telephone call, send e-mail, play a game, or use an application program. When the portable telephone device 100 is in the closed state, use of the portable telephone device 100 is limited to particular functions such as a music playback function, a recording function, etc.

The light emitting unit 111 is configured using an LED (Light Emitting Diode) or the like to emit light. When light emitted by the light emitting unit 111 falls on a finger of a user, the light is reflected. The reflected light is detected by the light detecting unit 112. The light detecting unit 112 may be configured such that the reflected light is focused using a lens and the focused light is detected. In accordance with movement of light detected by the light detecting unit 112, the DSP 113 sends a command to the controller 101 to move the pointer on the display 109. The moving direction, the moving distance, and the moving speed of the pointer are determined as follows.

Figure 4:
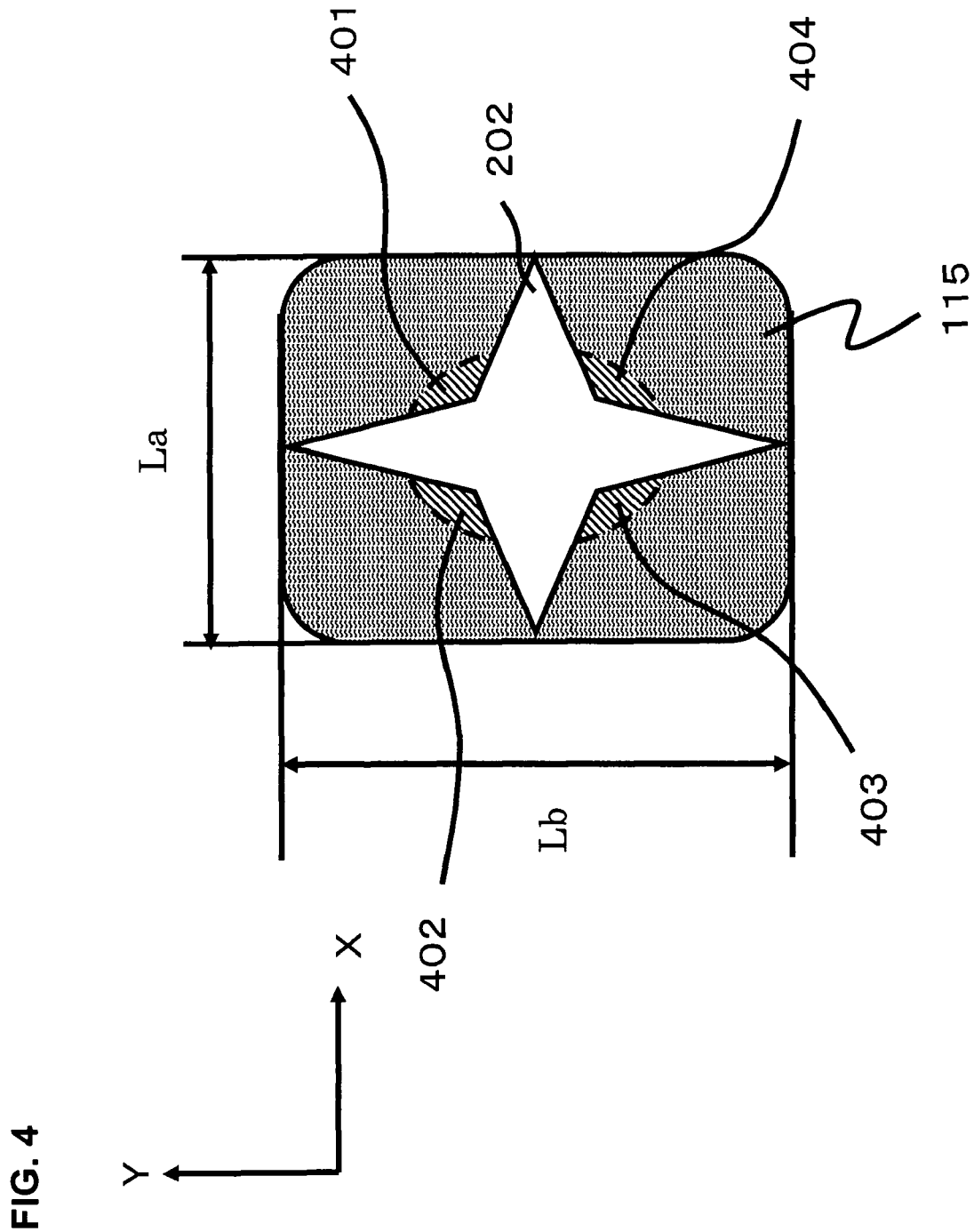
FIG. 4 shows external appearances of a pressure sensor and a window according to an embodiment of the present invention.

In the light detecting unit 112, an X CCD line sensor using CCDs is disposed in an X direction as shown in FIG. 4 and a Y CCD line sensor (not shown) is disposed in a Y direction. Light reflected from the finger of the user is focused on the CCD line sensors via a lens. In response to a clock signal supplied from a CCD driver, the X CCD line sensor and the Y CCD line sensor sequentially output image signals from CCD elements of the X and Y CCD line sensors. The image signals output from the X CCD line sensor and the Y CCD line sensor are binarized into two levels respectively corresponding to a white level and a black level. The resultant two-level image data are sequentially stored into an X register and a Y register (not shown). When next scanning is performed on the X CCD line sensor and the Y line sensor, the data stored in the X register and the Y register are transferred to an XX register and a YY register, and new image data output as a result of the scanning are stored into the X register and the Y register. The DSP 113 calculates the amount and direction of the movement of the finger by comparing the image data stored in the XX and YY registers with the image data stored in the X and Y registers. The X CCD line sensor and the Y CCD line sensor are scanned periodically at intervals of t seconds. The image data obtained as a result of the latest scanning are stored in the X register and the Y register, and the image data obtained as a result of the scanning performed t seconds before the latest scanning are stored in the XX register and the YY register. The data stored in the X register and the Y register are compared with the data stored in the XX register and the YY register by the DSP 113 to calculate the amount and the direction of the movement of the finger.

The amount and the direction of the movement calculated by the DSP 113 indicating the amount and the direction by/in which to move the pointer on the display 109 are sent to the controller 101.

The A/D converter 114 converts an analog signal indicating the pressure detected by the pressure sensor 115 into a digital signal. The moving speed of the pointer displayed on the display 109 is controlled depending on the pressured detected by the pressure sensor 115 such that the pointer is moved faster when the detected pressure is greater.

An input unit is formed by the light emitting unit 111, the light detecting unit 112, and the DSP 113. In the present embodiment, this input unit is referred to as an optical input unit 116. On the other hand, an input unit formed by the A/D converter 114 and the pressure sensor 115 is referred to as a first pressure-sensitive input unit 117. Thus, a user is allowed to determine the direction in which to move the pointer displayed on the display 109 by using the optical input unit 116, and is allowed to determine the moving speed of the pointer by using the first pressure-sensitive input unit 117.

In the present embodiment, although not shown in the figure, the portable telephone device 100 also has a storage unit adapted to store data which has been received from or is to be sent to another portable telephone device.

Figure 2:
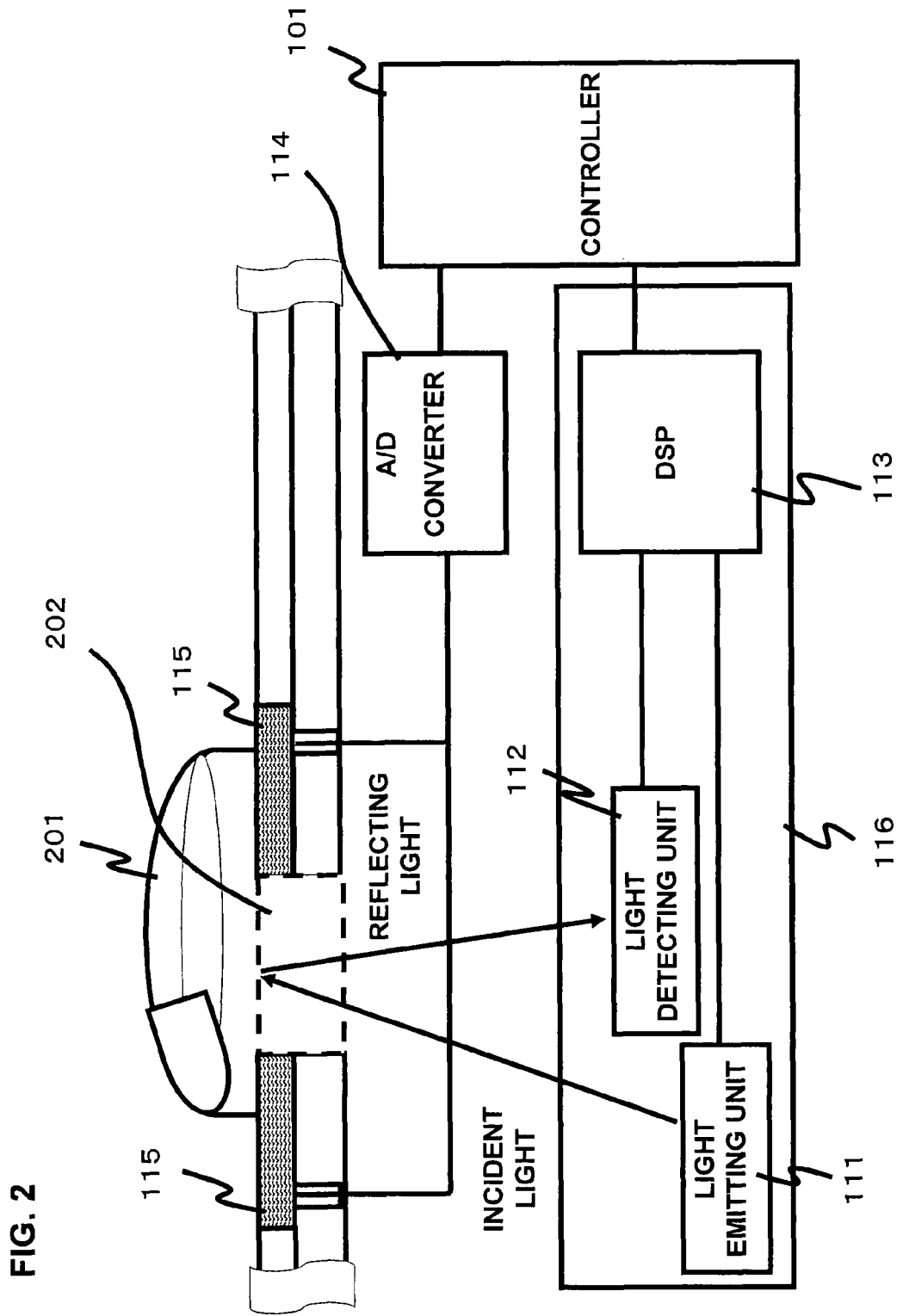
FIG. 2 is a schematic cross-sectional view of an optical input unit and a pressure-sensitive input unit according to an embodiment of the present invention.

FIG. 2 is a schematic cross-sectional view of the optical input unit 116 and the pressure-sensitive input unit 117.

A user is allowed to perform an inputting operation by moving and pressing his/her finger 201 on the pressure sensor 115 and a window 202. The window 202 is formed of a material such as glass, plastic, or acrylic capable of passing light emitted by the light emitting unit 111 therethrough. The pressure sensor 115 is disposed around the window 202 so that when a user puts his/her finger 202 on the window, the finger 202 is also in contact with the pressure sensor 115.

When the light emitting unit 111 emits light, the light strikes the user's finger 201 and is reflected therefrom. The reflected light is focused by the lens and detected by the light detecting unit 112.

In accordance with movement of the light detected by the light detecting unit 112, the DSP 113 sends a command to the controller 101 to move the pointer on the display 109.

The A/D converter 114 converts an analog signal indicating the pressure detected by the pressure sensor 115 into a digital signal and sends the resultant digital signal to the controller 101. In accordance with the digital signal received from the A/D converter 114, the controller 101 determines the speed at which to move the pointer on the display 109.

Figure 3:
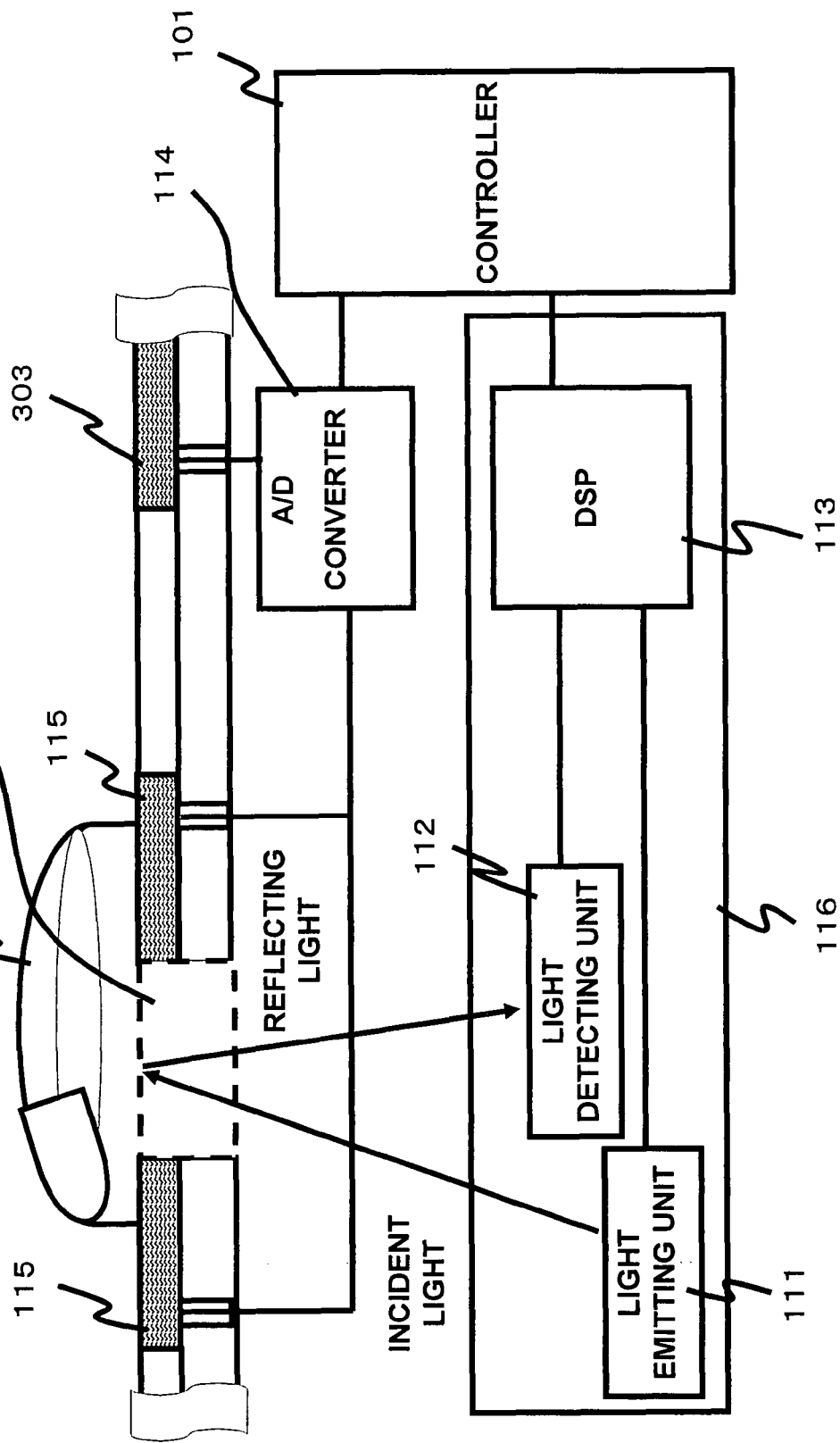
FIG. 3 is a schematic cross-sectional view of an optical input unit and a pressure-sensitive input unit according to an embodiment of the present invention.

FIG. 3 is a schematic cross-sectional view of an optical input unit and a pressure-sensitive input unit according to an embodiment of the present invention;

As shown in FIG. 3, a pressure sensor 303 with no window may also be disposed on a portable telephone device 100 so that a user is allowed to use the pressure sensor 303 to input a command different from that input using the pressure sensor 115.

FIG. 4 shows external appearances of the pressure sensor 115 and the window 202.

As shown in FIG. 4, the window 202 is formed in the shape of a cross so as to be capable of detecting the movement of the finger 201 in the X and Y directions. The shape of the window 202 is not limited to the cross, but the window 202 may be formed in other shapes such as a circle or an ellipse as long as the finger 201 is allowed to be kept in contact with the pressure sensor 115 when a user moves his/her finger 201 on the window 202.

The pressure sensor 115 is formed in the shape of a rectangle and is disposed so as to surround the outer periphery of the window 202. In the present embodiment, the pressure sensor 115 has a greater length La in the X direction than a length Lb in the Y direction so that a user is allowed to move his/her finger 201 a longer distance in the Y direction than in the X direction.

If all determination parts 401, 402, 403, and 404 of the pressure sensor 115 simultaneously detect pressures greater than a predetermined threshold value, the controller 101 issues an "Apply" command to the portable telephone device 100.

For example, when selectable items are displayed on the display 109, if a user moves the pointer to point to a desired one of the items by using the optical input unit 116 and the pressure-sensitive input unit 117, and if the user simultaneously presses all determination parts 401, 402, 403, and 404 of the pressure sensor 115 at a pressure greater than the predetermined threshold value, then the item pointed to by the pointer is selected. Note that simultaneous pressing of all determination parts 401, 402, 403, and 404 of the pressure sensor 115 is accomplished by pressing not only one of the determination parts but all determination parts simultaneously.

Alternatively, instead of issuing the "Apply" command when all determination parts 401, 402, 403, and 404 of the pressure sensor 115 are simultaneously pressed at pressures greater than the predetermined threshold value, the "Apply" command may be issued when the pressure sensor 303 (shown in FIG. 3) detects a pressure greater than a predetermined threshold value.

Figure 9:
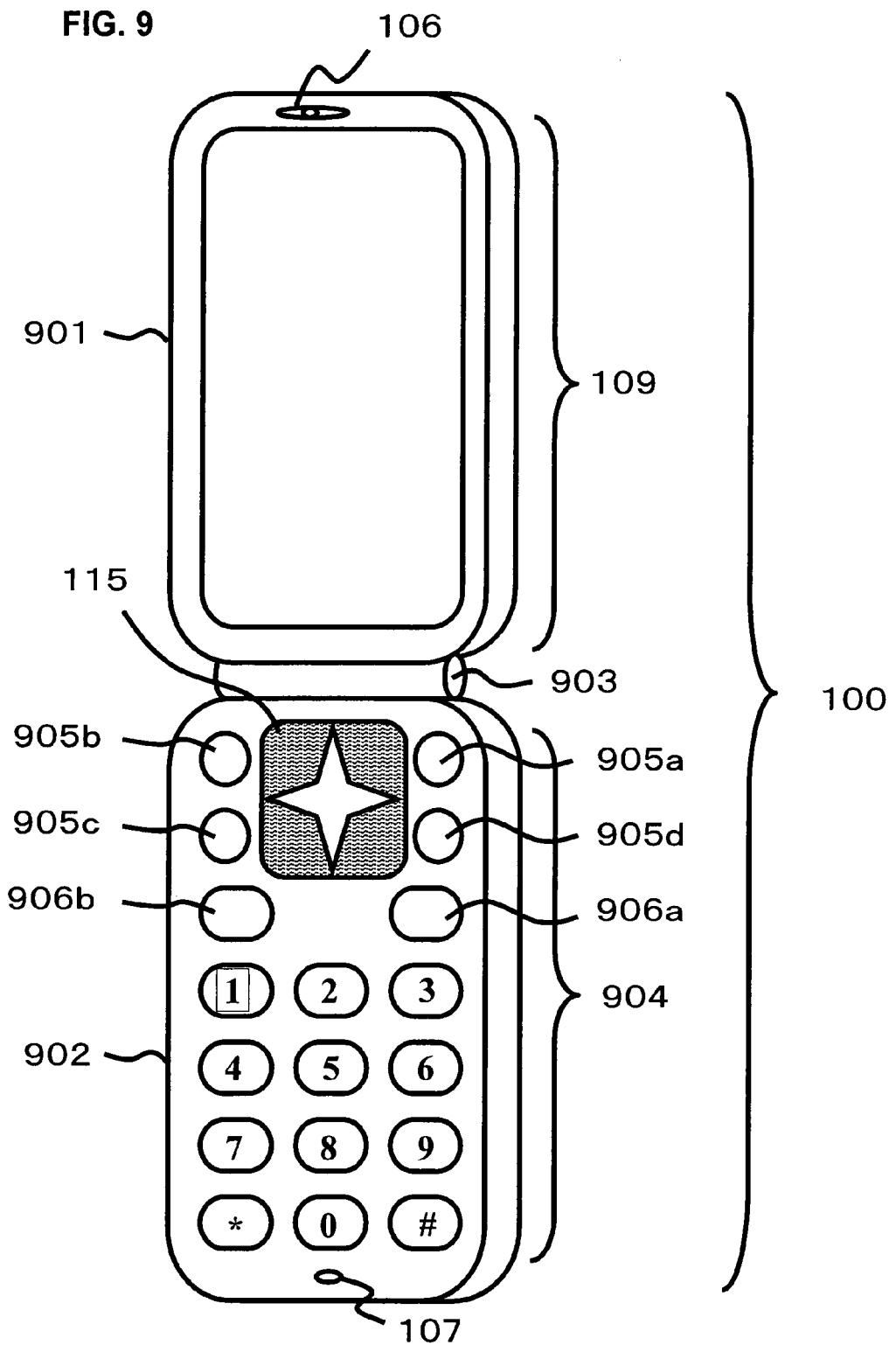
FIG. 9 is a schematic diagram of a portable telephone device according to an embodiment of the present invention.

FIG. 9 is a schematic diagram showing the appearance of the portable telephone device 100 according to the present embodiment of the invention.

The portable telephone device 100 includes case parts 901 and 902 which are connected via a hinge 903 so as to be openable and closable. An operation unit 904 and a microphone 107 are disposed on the case part 902, and the display 109 and the speaker 106 are disposed on the case part 901. The display 109 is adapted to display thereon a menu, a main body of mail, various applications, etc. The operation unit 904 includes the numeric keypad 104, function keys 905a, 905b, 905c, and 905d, the communication end key 906a, the communication start key 906b, the optical input unit 116, the pressure-sensitive input unit 117, etc. The user is allowed to use the operation unit 904 to input a telephone number or a mail address or to call various functions of the portable telephone device 100 and input commands associated with called functions. Note that the optical input unit 116 is disposed inside the portable telephone device 100, and thus it is not shown in FIG. 9 illustrating the external appearance of the portable telephone device 100. The A/D converter 114 of the pressure-sensitive input unit 117 is also disposed inside the portable telephone device 100, and thus only the pressure sensor 115 of the pressure-sensitive input unit 117 is shown but the A/D converter 114 is not shown in FIG. 9 illustrating the external appearance of the portable telephone device 100.

The portable telephone device 100 is connected to a base station via a radio link and is capable of communication with another portable telephone device via an exchange connected to the base station.

Figure 10:
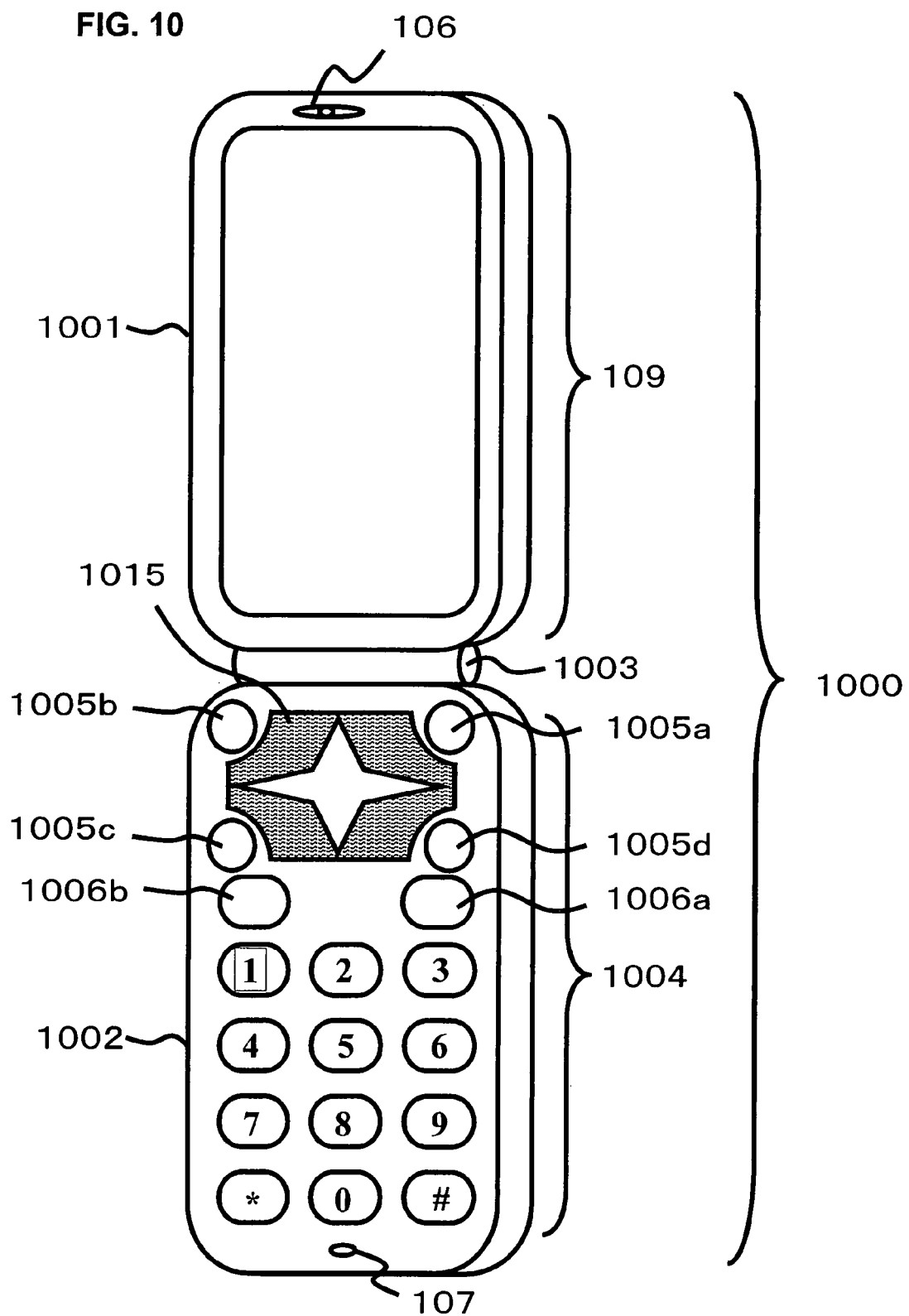
FIG. 10 is a schematic diagram of a portable telephone device according to an embodiment of the present invention.

FIG. 10 is a schematic diagram showing the appearance of a portable telephone device 1000 according to an alternative embodiment of the invention.

The portable telephone device 1000 includes case parts 1001 and 1002 which are connected via a hinge 1003 so as to be openable and closable. An operation unit 1004 and a microphone 107 are disposed on the case part 1002, and a display 109 and a speaker 106 are disposed on the case part 1001. The display 109 is adapted to display thereon a menu, a main body of mail, various applications, etc. The operation unit 1004 includes a numeric keypad 104, function keys 1005a, 1005b, 1005c, and 1005d, a communication end key 1006a, a communication start key 1006b, an optical input unit 116, a pressure-sensitive input unit 117, etc. The user is allowed to use the operation unit 1004 to input a telephone number or a mail address or to call various functions of the portable telephone device 1000 and input commands associated with called functions. Note that the optical input unit 116 is disposed inside the portable telephone device 1000, and thus it is not shown in FIG. 10 illustrating the external appearance of the portable telephone device 1000. The A/D converter 114 of the pressure-sensitive input unit 117 is also disposed inside the portable telephone device 1000, and thus only the pressure sensor 1015 of the pressure-sensitive input unit 117 is shown but the A/D converter 114 is not shown in FIG. 10 illustrating the external appearance of the portable telephone device 1000.

In the case of the portable telephone device 1000, the pressure sensor 1015 is formed in a shape obtained by extending the shape of the pressure sensor 115 into a space between function keys 1005b and 1005c and into a space between function keys 1005d and 1005a. That is, the shape of the pressure sensor 1015 is obtained by cutting four corners of an original rectangle so as to fit the locations of function keys 1005a, 1005b, 1005c, and 1005d. In other words, in the present embodiment, the function keys 1005a, 1005b, 1005c, and 1005d are disposed on the case part 1002 at locations corresponding to four corners of the original rectangle of the pressure sensor 1015.

This modified shape of the pressure sensor 1015 allows a user to move his/her finger 201 over a greater range.

Figure 11:
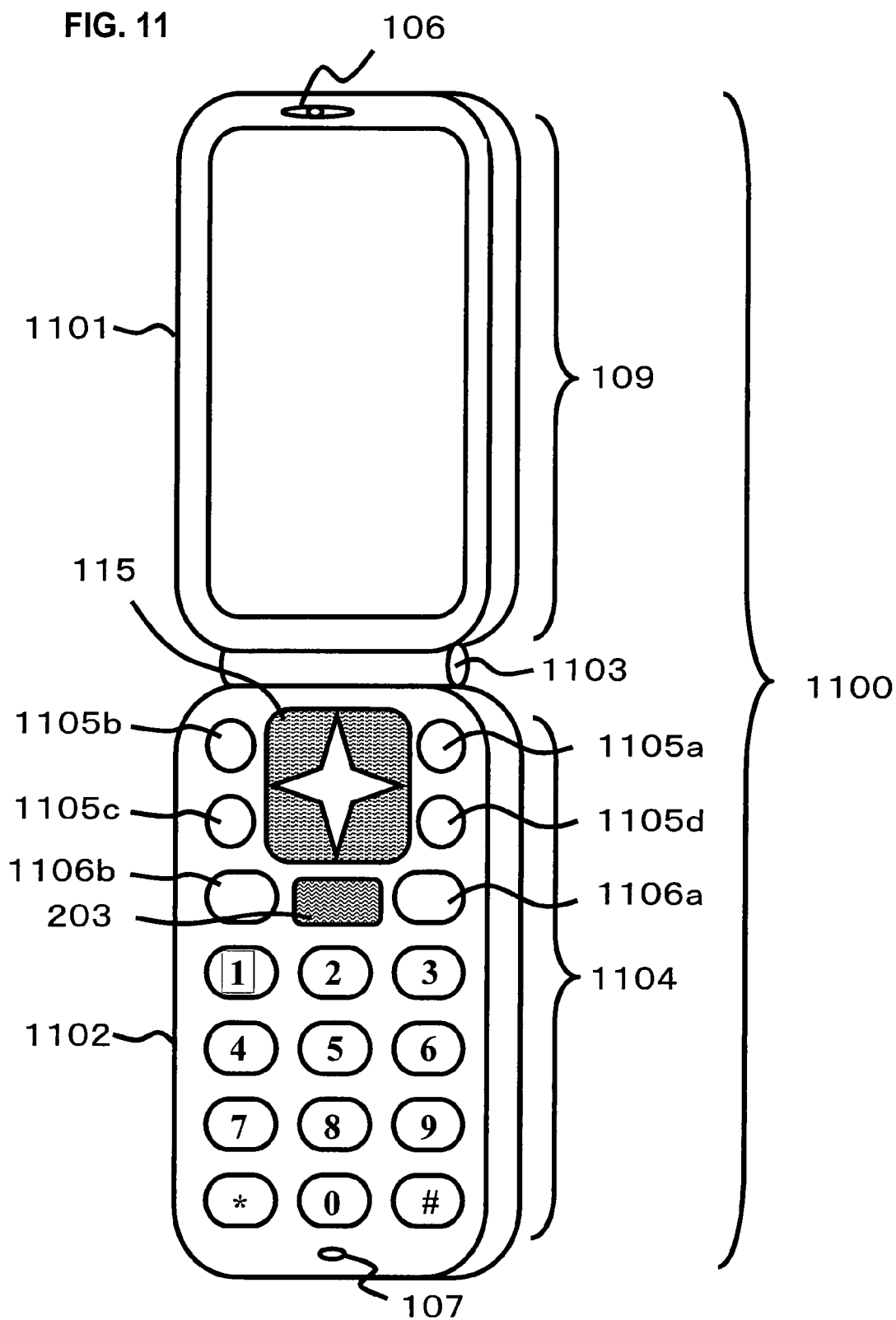
FIG. 11 is a schematic diagram of a portable telephone device according to an embodiment of the present invention.

FIG. 11 is a schematic diagram showing the appearance of a portable telephone device 1100 according to an alternative embodiment of the invention. The portable telephone device 1100 includes case parts 1101 and 1102 which are connected via a hinge 1103 so as to be openable and closable. An operation unit 1104 and a microphone 107 are disposed on the case part 1102, and a display 109 and a speaker 106 are disposed on the case part 1101. The display 109 is adapted to display thereon a menu, a main body of mail, various applications, etc. The operation unit 1104 includes a numeric keypad 104, function keys 905a, 905b, 905c, and 905d, a communication end key 906a, a communication start key 906b, an optical input unit 116, a pressure-sensitive input unit 117, etc. The user is allowed to use the operation unit 1104 to input a telephone number or a mail address or to call various functions of the portable telephone device 1100 and input commands associated with called functions. Note that the optical input unit 116 is disposed inside the portable telephone device 1100, and thus it is not shown in FIG. 11 illustrating the external appearance of the portable telephone device 1100. The A/D converter 114 of the pressure-sensitive input unit 117 is also disposed inside the portable telephone device 1100, and thus only the pressure sensor 115 of the pressure-sensitive input unit 117 is shown but the A/D converter 114 is not shown in FIG. 11 illustrating the external appearance of the portable telephone device 1100.

The portable telephone device 1100 has a pressure sensor 303 disposed between a communication end key 1106a and a communication start key 1106b. As shown in FIG. 3, the pressure sensor 303 is connected to the A/D converter 114 so that a user is allowed to perform an inputting operation using the pressure sensor 303.

Figure 12:
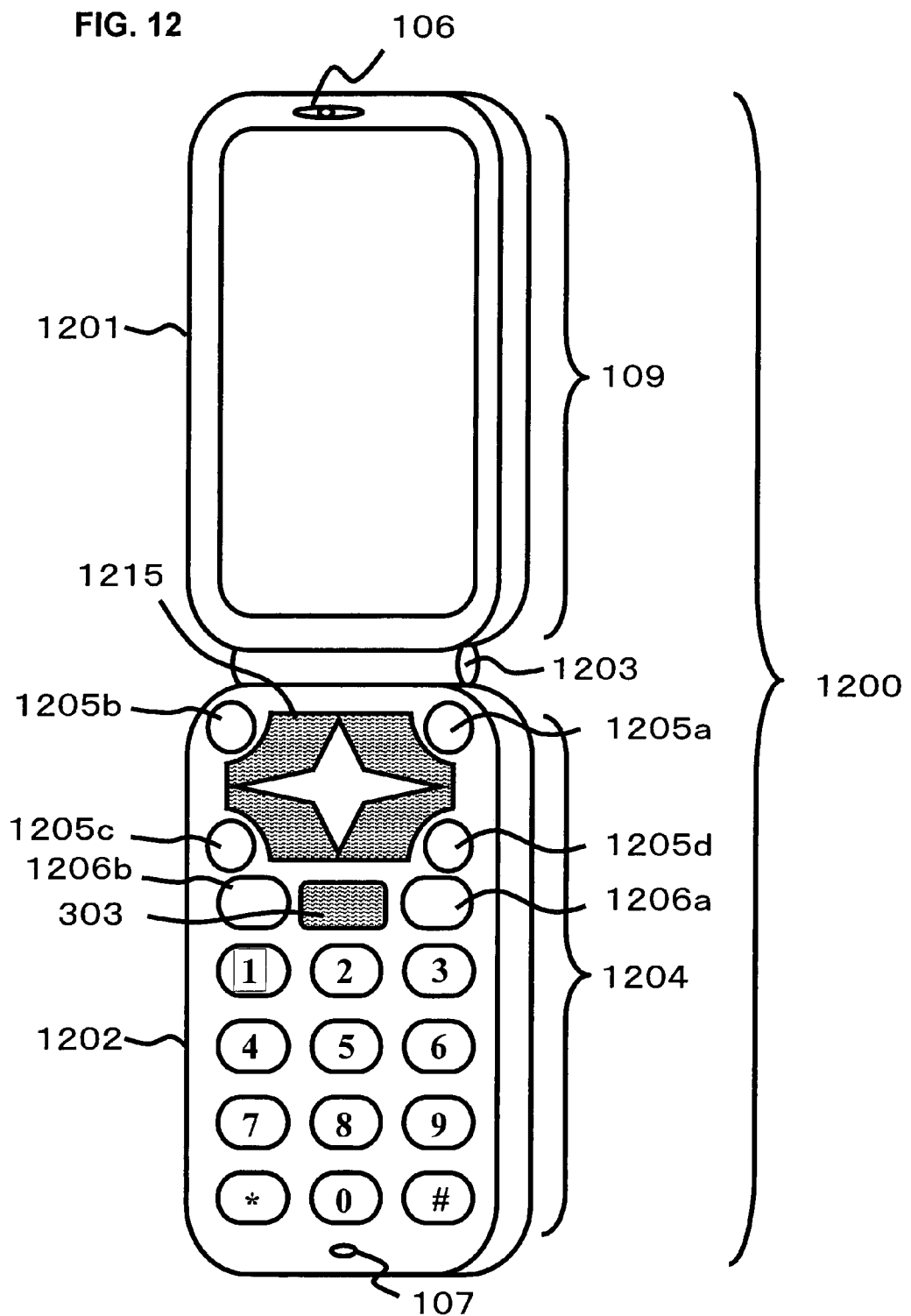
FIG. 12 is a schematic diagram of a portable telephone device according to an embodiment of the present invention.

FIG. 12 is a schematic diagram showing the appearance of a portable telephone device 1200 according to an alternative embodiment of the invention. The portable telephone device 1200 includes case parts 1201 and 1202 which are connected via a hinge 1203 so as to be openable and closable. An operation unit 1204 and a microphone 107 are disposed on the case part 1202, and a display 109 and a speaker 106 are disposed on the case part 1201. The display 109 is adapted to display thereon a menu, a main body of mail, various applications, etc. The operation unit 1204 includes a numeric keypad 104, function keys 1205a, 1205b, 1205c, and 1205d, a communication end key 1206a, a communication start key 1206b, an optical input unit 116, a pressure-sensitive input unit 117, etc. The user is allowed to use the operation unit 1204 to input a telephone number or a mail address or to call various functions of the portable telephone device 1200 and input commands associated with called functions. Note that the optical input unit 6 is disposed inside the portable telephone device 1200, and thus it is not shown in FIG. 12 illustrating the external appearance of the portable telephone device 1100. The A/D converter 114 of the pressure-sensitive input unit 117 is also disposed inside the portable telephone device 1200, and thus only the pressure sensor 1215 of the pressure-sensitive input unit 117 is shown but the A/D converter 114 is not shown in FIG. 12 illustrating the external appearance of the portable telephone device 1200.

In the case of the portable telephone device 1200, the pressure sensor 1215 is formed in a shape obtained by extending the shape of the pressure sensor 1215 into a space between function keys 1205b and 1205c and into a space between function keys 1205d and 1205a. That is, the shape of the pressure sensor 1215 is obtained by cutting four corners of an original rectangle so as to fit the locations of function keys 1205a, 1205b, 1205c, and 1205d. In other words, in the present embodiment, the function keys 1205a, 1205b, 1205c, and 1205d are disposed on the case part 1202 at locations corresponding to four corners of the original rectangle of the pressure sensor 1215.

In this configuration, the window 202 is formed to have a large size so that a user is allowed to move his/her finger 201 over a greater area.

The portable telephone device 1200 has a pressure sensor 303 disposed between a communication end key 1206a and a communication start key 1206b. As shown in FIG. 3, the pressure sensor 303 is connected to the A/D converter 114 so that a user is allowed to perform an inputting operation using the pressure sensor 303.

FIG. 5 shows a power control table according to an embodiment of the present invention.

The turning-on/off of the power of the portable telephone device 100 is controlled by the power controller 105.

The open/closed-state sensor 110 detects whether the portable telephone device 100 is in an open state 500 or in a closed (folded) state 501. When the open/closed-state sensor 110 is detects that the portable telephone device 100 is in the closed state 501, the portable telephone device 100 cannot be in the open state 500. If the open/closed-state sensor 110 detects that the portable telephone device 100 is in the closed state 501 (and not in the open state 500), the power of the portable telephone device 100 is turned off into an OFF state 503. When the portable telephone device 100 is in the closed state 501, the pressure sensor 110 is in a not-pressed state 502 and the light emitting unit 111 is in an OFF state 504. If the open/closed-state sensor 110 detects the open state 500, the electric power of the portable telephone device 100 is turned on into an ON state 505 or 506. When the portable telephone device is in the ON state 505 or 506, a user is allowed to use the portable telephone device 100 to make a telephone communication, transmit/receive mail, or use various applications. In an initial state just after the portable telephone device 100 has been turned on (and thus the portable telephone device 100 is in the ON state 505 or 506), no electric power is supplied to the light emitting unit 111, and thus no light is emitted.

If the open/closed-state sensor 110 detects that the portable telephone device 100 is in the open state 500, supplying of the electric power to the light emitting unit 111 is controlled depending on whether a pressure is detected by the pressure sensor 115. More specifically, when the pressure sensor 115 is still in the non-detected state 507 after a predetermined time period has elapsed, no electric power is supplied to the light emitting unit 111, and thus the light emitting unit 111 is in an OFF state 508. When the pressure sensor 115 detects a pressure within the predetermined time period, that is when the pressure is in a pressed state 509, electric power is supplied to the light emitting unit 111 and thus the light emitting unit 111 goes into an ON state 510. If electric power is supplied to the light emitting unit 111, the light emitting unit 111 is activated and light is emitted therefrom. That is, as shown in FIG. 5, when electric power is being supplied to the light emitting unit 111, the light emitting unit is in the ON state, while it is in the OFF state when no electric power is supplied to the light emitting unit 111.

By controlling electric power in the above-described manner, limited electric power of the portable telephone device 100 is used efficiently.

The movement of the pointer displayed on the display 109 is controlled by the controller 101 in accordance with a pointer moving command supplied from the DSP 111. In the present embodiment, a user is allowed to separately specify a display gear ratio X in the X direction and a display gear ratio Y in the Y direction. The pointer moving command supplied from the DSP 113 to the controller 101 indicates the distance the user has moved his/her finger 201 on the window 202. That is, the distance XLa and the distance YLb the finger 201 has moved in the X and Y directions are informed to the controller 101.

The controller 101 multiplies the distances XLa and XLb by the corresponding display gear ratios X and Y and the controller 101 moves the pointer on the display 109 by the distances equal to the calculated products. More specifically, the controller 101 moves the pointer on the display 109 by a distance of XLA×X in the X direction and a distance of XLb×Y in the Y direction.

The light emitting unit 111 is adapted to emit light of three colors, that is, red, green, and blue light. A user is allowed to select a desired color of light from these three colors. When the user specifies a color other than the three colors, the light emitting unit 111 represents the specified color by properly mixing the three colors. Because the wavelength of light varies with its color, the light detecting unit 112 adjusts the sensitivity depending on the wavelength of light.

For example, when music or the like is played back using the portable telephone device 100, the color of the light emitted by the light emitting unit 111 may be varied in synchronization with music. That is, the multi-color capability not only provides the simple inputting function but also allows a user to enjoy a beautiful illumination.

Figure 14:
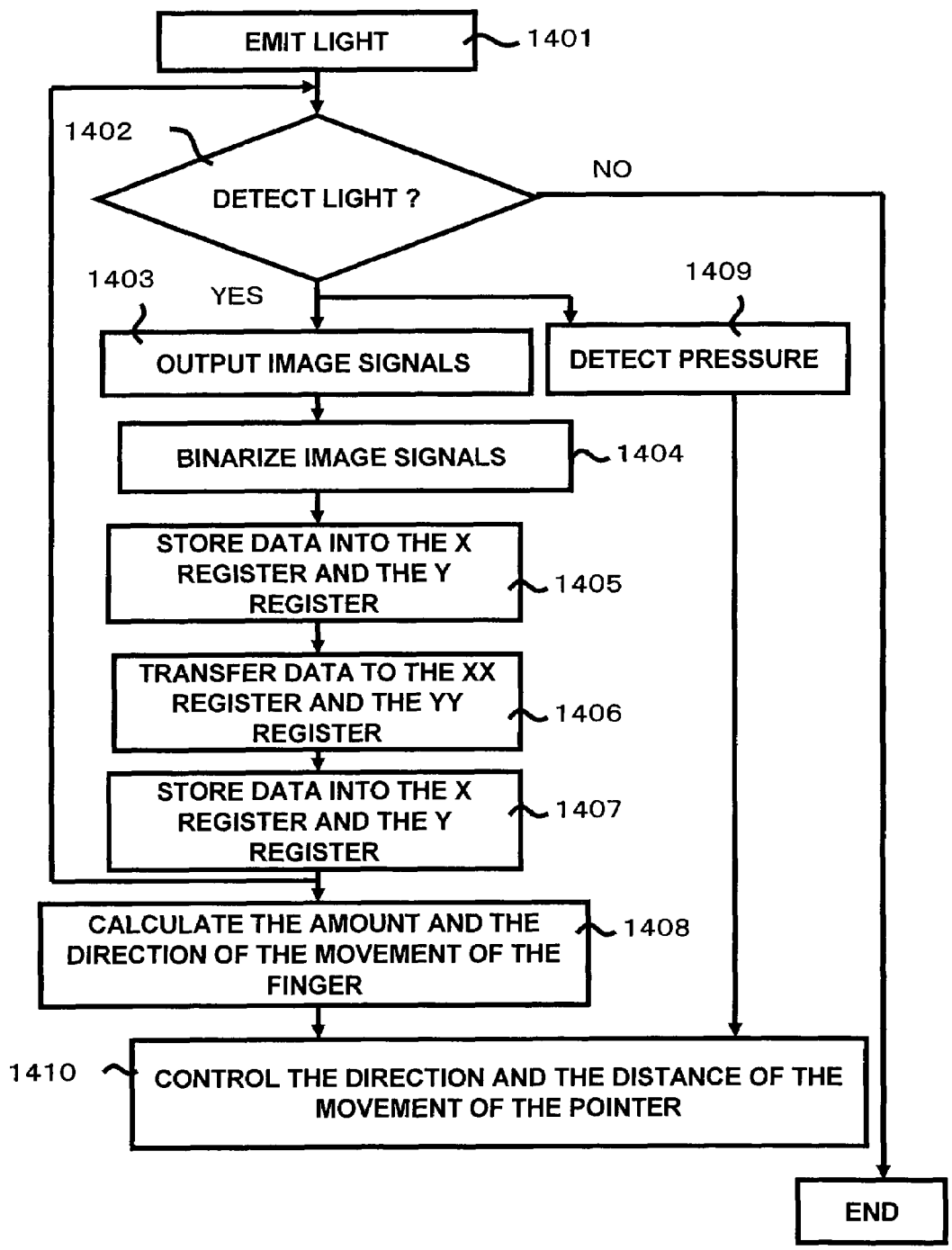
FIG. 14 is a flow chart showing an input control process according to an embodiment of the present invention.

FIG. 14 is a flow chart showing a process associated with the inputting operation according to an embodiment of the invention.

First, the light emitting unit 111 emits light to illuminate a finger of a user with the light (step 1401). The light reflected from the finger of the user is focused via a lens on the CCD line sensor of the light detecting unit 112 and detected thereby (step 1402). In response to the clock signal supplied from the CCD driver, the X CCD line sensor disposed in the X direction and the Y CCD line sensor disposed in the Y direction sequentially image signals from CCD elements of the X CCD line sensor and the Y CCD line sensor (step 1403).

The image signals output from the X CCD line sensor and the Y CCD line sensor are binarized into two levels respectively corresponding to a white level and a black level (step 1404). The resultant two-level image data are sequentially stored into the X register and the Y register (step 1405).

The X CCD line sensor and the Y CCD line sensor are scanned periodically at intervals of t seconds. The image data obtained as a result of the latest scanning are stored in the X register and the Y register, and the image data obtained as a result of the scanning performed t seconds before the latest scanning are stored in the XX register and the YY register. When next scanning is performed on the X CCD line sensor and the Y line sensor, the data stored in the X register and the Y register are transferred to the XX register and the YY register (step 1406), and new image data output as a result of the scanning are stored into the X register and the Y register (step 1407). Note that the time t is measured with respect to the time at which the image data have just been stored into the X register and the Y register.

The DSP 113 calculates the amount and the direction of the movement of the finger by comparing the image data stored in the XX and YY registers with the image data stored in the X and Y registers (step 1408).

When the reflected light is detected by the X CCD line sensor and the Y CCD line sensor, the pressure sensor 115 detects a pressure applied thereto by the finger (step 1409).

The controller 101 controls the direction and the distance of the movement of the pointer in accordance with the direction and the distance detected by the light detecting unit 112 and controls the moving speed of the pointer in accordance with the magnitude of the pressure detected by the pressure sensor 115 (step 1410).

If, in step 1402, no reflected light is detected by the CCD line sensors, the input control process is ended.

Figure 15:
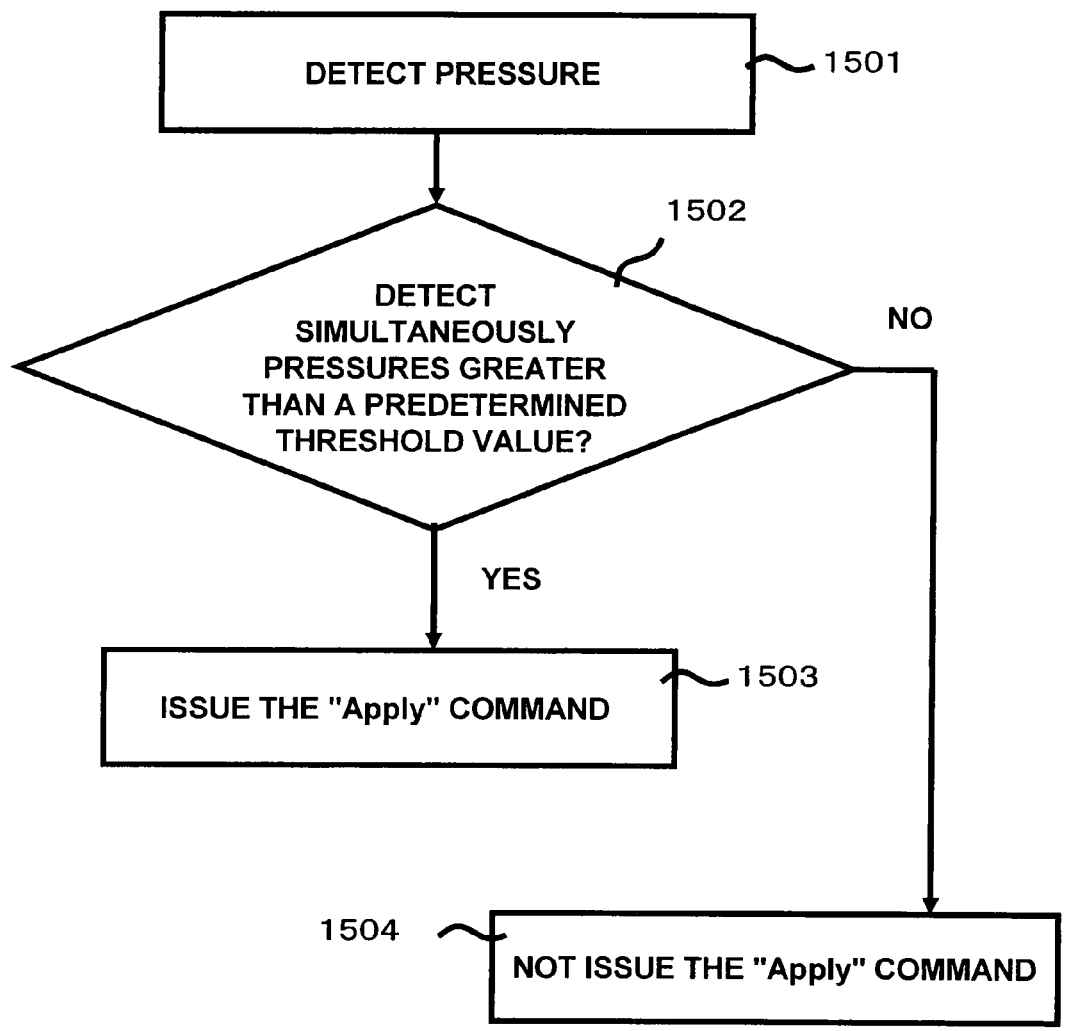
FIG. 15 is a flow chart showing an input control process according to an embodiment of the present invention.

FIG. 15 is a flow chart showing an input control process according to an embodiment of the invention.

If the pressure sensor 115 detects a pressure applied thereto (step 1501), it is determined whether all determination parts 401, 402, 403, and 404 of the pressure sensor 115 are simultaneously pressed at pressures greater than a predetermined threshold value (step 1502). If all determination parts 401, 402, 403, and 404 have simultaneously detected pressures greater than the predetermined threshold value, the controller 101 issues the "Apply" command to the portable telephone device 100 (step 1503). If a pressure greater than the predetermined value are not detected simultaneously by all determination parts 401, 402, 403, and 404, the controller 101 does not issue the "Apply" command to the portable telephone device 100 (step 1504).

In the embodiments described above, the direction in which to move the pointer is specified by using the optical input unit 116 and the moving speed of the point is specified by using the pressure-sensitive input unit 117. Alternatively or additionally, for example, when a game application such as a car race game or the like is executed on the portable telephone device 100, the direction in which to move a car may be specified by using the optical input unit 116 and the running speed of the car may be specified by using the pressure-sensitive input unit 117. That is, a user is allowed to control the movement of the car by using only his/her finger 201.

The light detecting unit 112 may have an illuminometer to adjust the brightness of the display 109 depending on light conditions in the environment. This allows it to control the power of the portable telephone device 100 more finely to further reduce the electric power consumption.

Second Embodiment

In a second embodiment described below, an inputting technique using a position sensor 612 and a pressure sensor 614 is disclosed.

Figure 6:
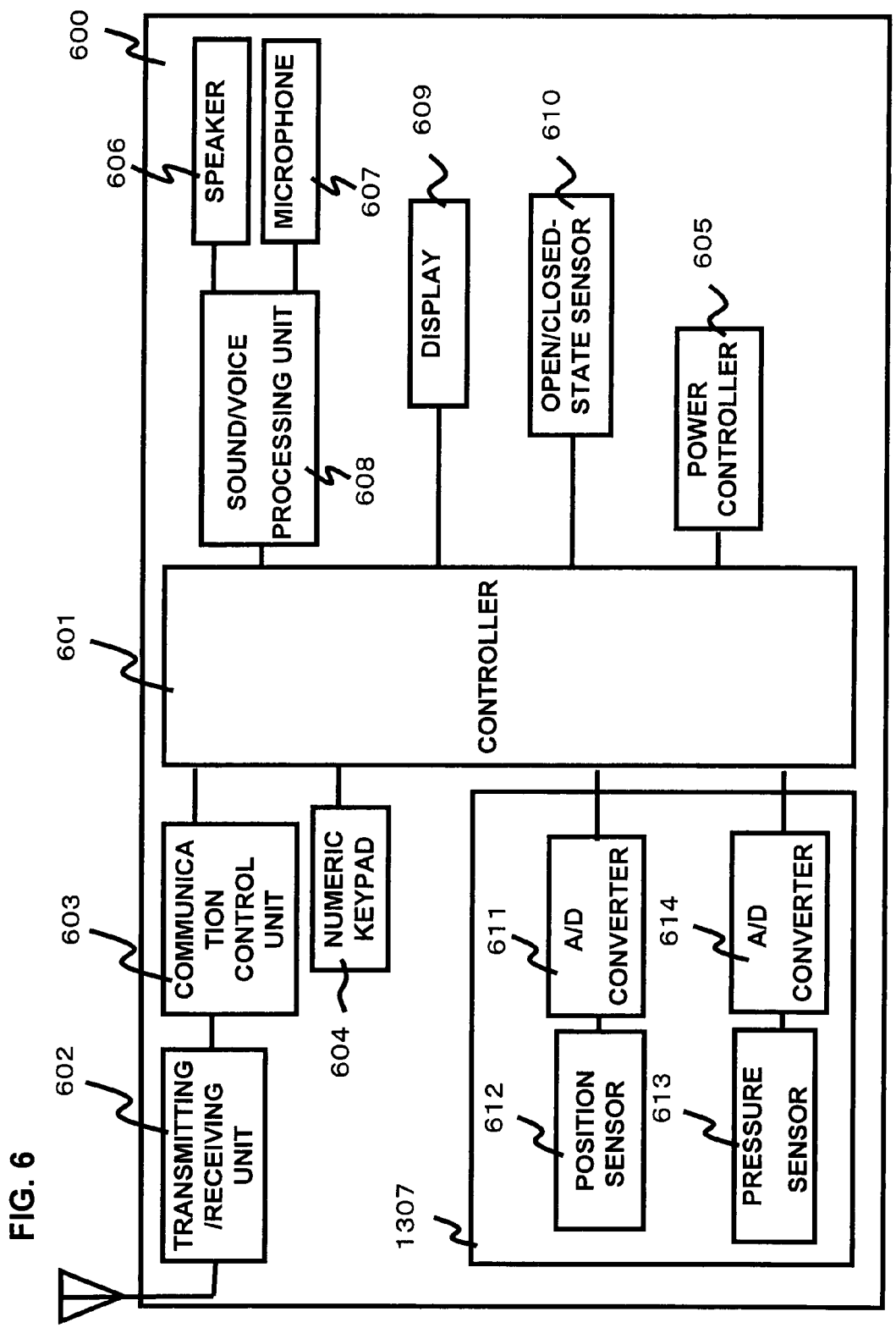
FIG. 6 is a hardware block diagram of an information processing apparatus according to an embodiment of the present invention.

FIG. 6 is a hardware block diagram of an information processing apparatus 600 according to the second embodiment of the present invention.

The Information processing apparatus 600 includes a controller 601, a transmitting/receiving unit 602, a communication control unit 603, a numeric keypad 604, a power controller 605, a speaker 606, a microphone 607, a sound/voice processing unit 608, a display 609, an open/closed-state sensor 610, an A/D converter 611, a position sensor 612, a DSP (Digital Signal Processor) 613, an A/D converter 614, and a pressure sensor 615.

In the present embodiment, it is assumed, by way of example, that the information processing apparatus 600 is a portable telephone device (and thus, hereinafter, the information processing apparatus 600 is referred to as a portable telephone device 600). Furthermore, the portable telephone device 600 is assumed to be of a folding type.

The controller 601 is realized by a computer including a CPU (Central Processing Unit), a ROM (Read-Only Memory), and a RAM (Random-Access Memory). The controller 601 generally controls processes performed in the portable telephone device 600. The controller 101 controls processes by executing a control program stored in the ROM disposed in the controller 101. The control program does not necessarily need to be stored in the ROM, but it may be stored in another storage medium similar to the ROM.

The transmitting/receiving unit 602 transmits and/or receives radio signal wave via an antenna. The communication control unit 603 modulates a carrier signal with a communication signal or a dial signal and demodulates a received signal.

The numeric keypad 604 is used to input a telephone number or a mail address. The numeric keypad 604 is also used to call various functions of the portable telephone device 600 and input commands associated with called functions. Although not shown in FIG. 6, in addition to the numeric keypad, the portable telephone device 100 also has other keys such as a communication start key, a communication end key, function keys, and arrow keys.

The power controller 605 controls turning-on/off of electric power of the portable telephone device 600. The control of turning-on/off of the power is performed in response to opening or closing (folding) of the portable telephone device 600, which is detected by the open/closed-state sensor 610 as will be described later. When the open/closed-state sensor 610 detects that the portable telephone device 600 is in the open state, the power is turned on. On the other hand, when open/closed-state sensor 610 detects that the portable telephone device 600 is in the closed state, the power is turned off.

The sound/voice processing unit 608 is connected to the speaker 606 and the microphone 607. The sound/voice processing unit 608 converts an analog sound/voice signal detected by the microphone 607 into a digital signal and converts a digital sound/voice signal output from the controller 601 into an analog signal. The speaker 606 reproduces a sound/voice in accordance with a sound/voice signal output from the controller 601 or a sound/voice signal detected by the microphone 607.

The display 609 is realized, for example, by an LCD (Liquid Crystal Display) and serves to display various kinds of information input or output to or from the controller 601.

The open/closed-state sensor 610 detects whether the portable telephone device 600 is in the open state or closed state. When the portable telephone device 600 is in the open state, a user is allowed to operate the portable telephone device 600 to make a telephone call, send e-mail, play a game, or use an application program. When the portable telephone device 600 is in the closed state, functions of the portable telephone device 600 usable by a user in this state is limited to particular functions.

The A/D converter 611 converts an analog signal indicating the moving direction detected by the position sensor 612 into a digital signal. When user moves his/her finger on the position sensor 612, the position sensor 612 detects the movement of a pressed point on the position sensor 612. The pointer displayed on the display 609 is moved in synchronization with the movement of the pressed point detected by the position sensor 612.

The A/D converter 613 converts an analog signal indicating the pressure detected by the pressure sensor 614 into a digital signal. If a user applies a pressure to the pressure sensor 614, the applied pressure is detected by the pressure sensor 614, and the moving speed of the pointer displayed on the display 609 is controlled such that the pointer moves faster when the applied pressure is greater.

In the present embodiment, although not shown in the figure, the portable telephone device 600 also has a storage unit adapted to store data which has been received from or is to be sent to another portable telephone device.

Figure 7:
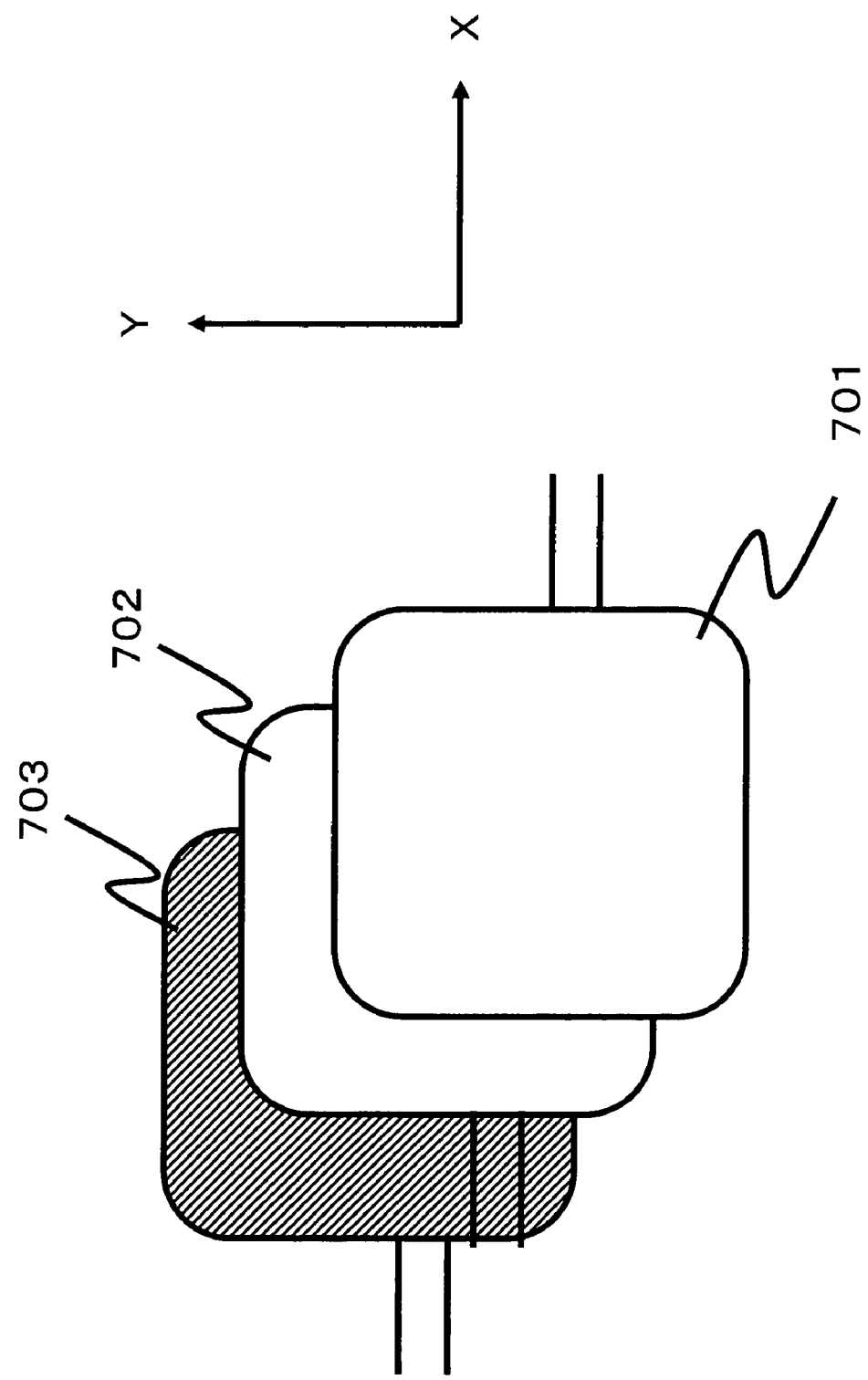
FIG. 7 is a schematic diagram showing external appearances of position sensors and a pressure sensor according to an embodiment of the present invention.

FIG. 7 is a schematic diagram showing external appearances of position sensors 701 and 702 and a pressure sensor 703 according to the present embodiment of the invention.

The position sensor 701 detects the movement of the pressed point in the X direction, while the position sensor 702 detects the movement of the pressed point in the Y direction. The pressure sensor 703 (corresponding to the pressure sensor 613 shown in FIG. 6) detects the magnitude of the pressure.

The positions sensors 701 and 702 and the pressure sensor 703 (the pressure sensor 614 in FIG. 6) are disposed one on another into a multilayer structure. In FIG. 7, for easier understanding, the positions sensors 701 and 702 and the pressure sensor 703 are drawn at shifted positions. The position sensor 612 described above is realized by a combination of the position sensor 701 and the position sensor 702.

Figure 8:
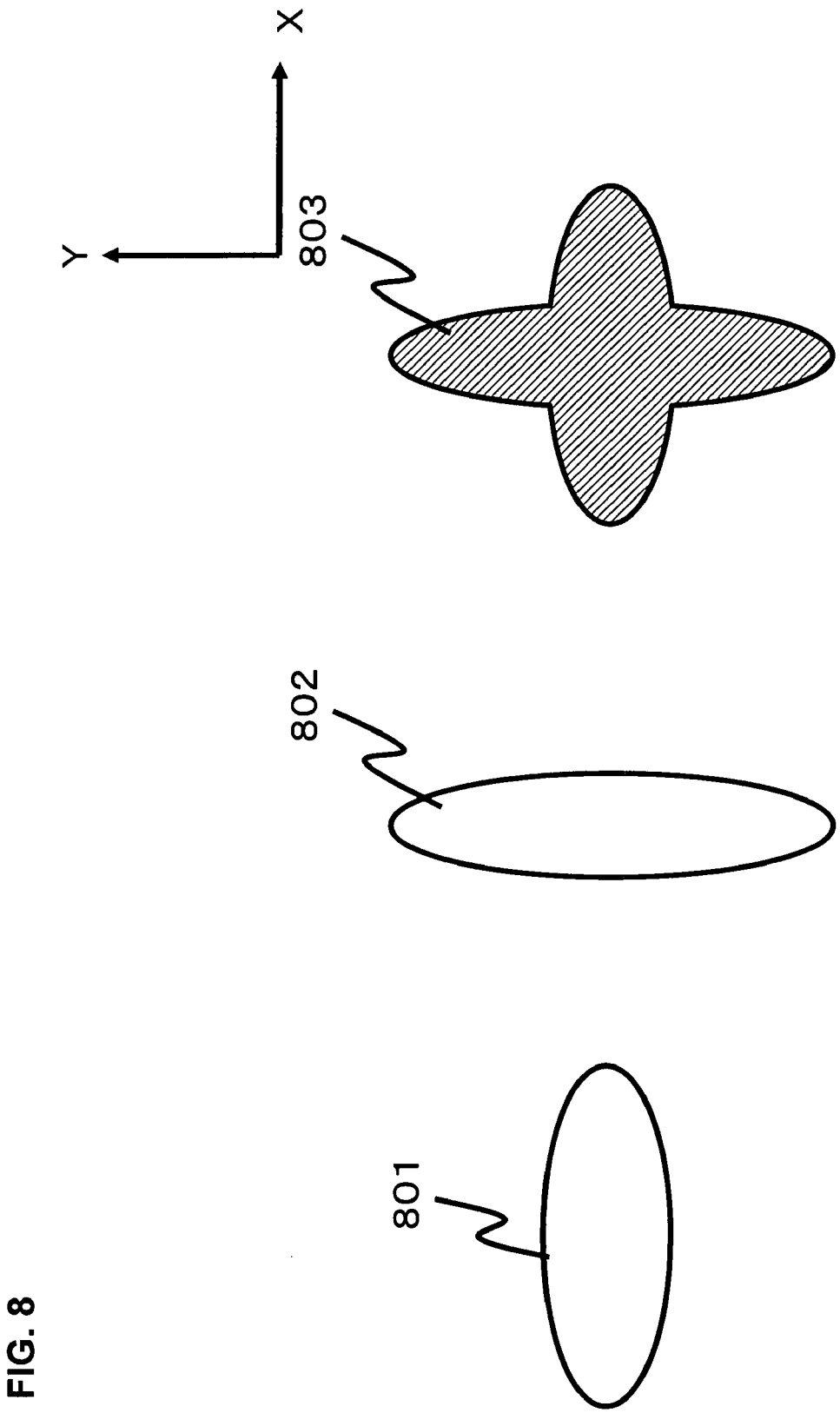
FIG. 8 is a schematic diagram showing external appearances of position sensors and a pressure sensor according to an embodiment of the present invention.

FIG. 8 shows shapes of the position sensors 701 and 702 (denoted as 801 and 802 in FIG. 8) and the shape of the pressure sensor 614 (denoted as 803 in FIG. 8).

In the present embodiment, the position sensors 701 and 702 and the pressure sensor 614 disposed on the portable telephone device 600 have shapes shown in FIG. 8.

The position sensor 801 for detecting the movement of the pressed point in the X direction is formed in the shape of an ellipse with a major axis extending in the X direction and a minor axis extending in the Y direction. The position sensor 802 for detecting the movement of the pressed point in the Y direction is formed in the shape of an ellipse with a major axis extending in the Y direction and a minor axis extending in the X direction. The pressure sensor 803 is formed in the shape of a cross whose center coincides with the centers of the position sensors 801 and 803. The position sensor 801, the position sensor 802, and the pressure sensor 803 are placed one on another into a multilayer structure and disposed on the portable telephone device 600. A pressure-sensitive input unit 1307 is formed by the position sensor 801, the position sensor 802, the pressure sensor 803, and the A/D converters 611 and 613.

A user is allowed to specify the position of the pointer by using the position sensors 801 and 802, and specify the moving speed of the pointer by using the pressure sensor 803.

Figure 13:
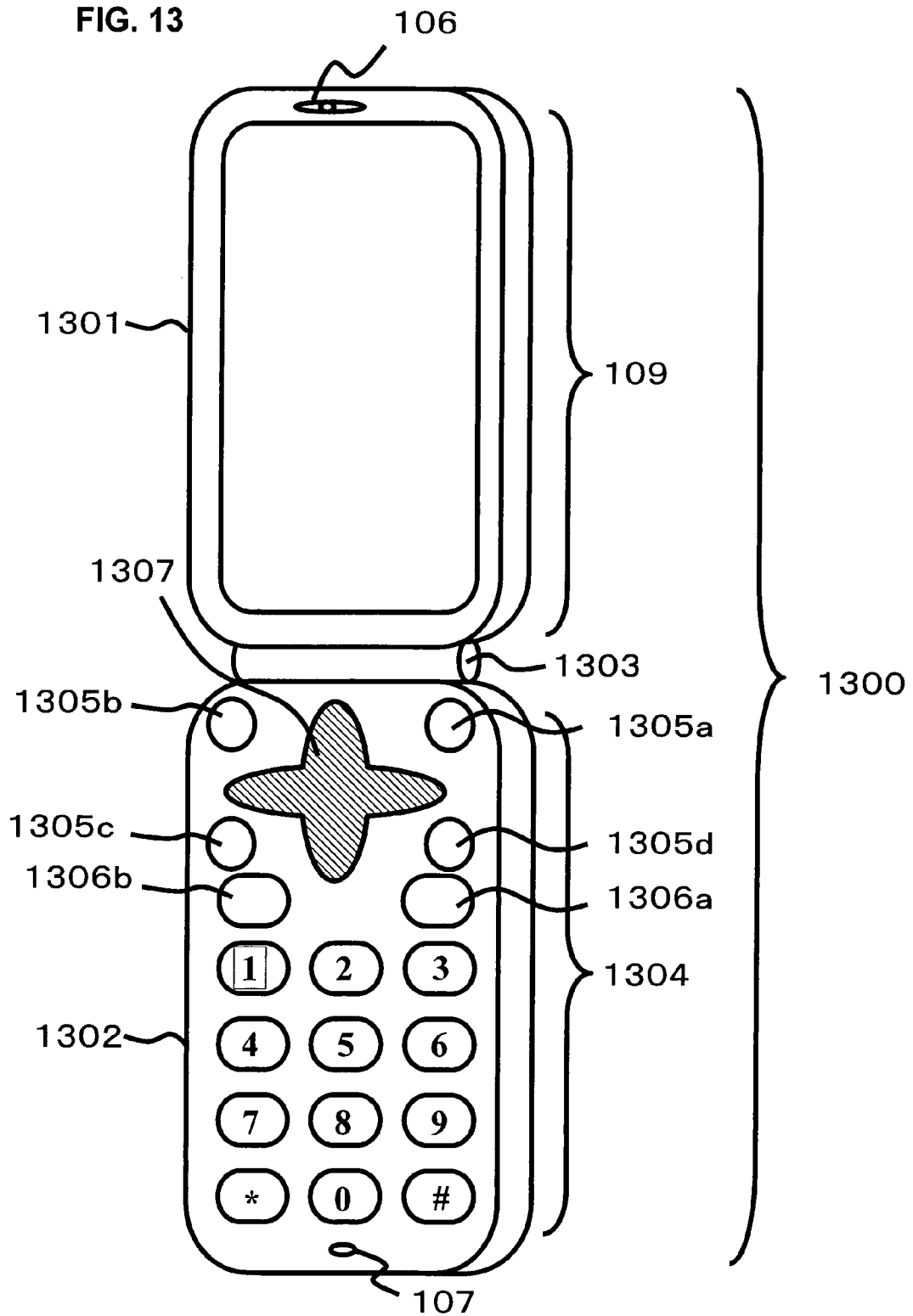
FIG. 13 is a schematic diagram of a portable telephone device according to an embodiment of the present invention.

FIG. 13 is a schematic diagram showing the appearance of a portable telephone device 1300 according to an embodiment of the invention.

The portable telephone device 1300 includes case parts 1301 and 1302 which are connected via a hinge 1303 so as to be openable and closable. An operation unit 1304 and a microphone 107 are disposed on the case part 1302, and a display 109 and a speaker 106 are disposed on the case part 1301. The display 109 is adapted to display thereon a menu, a main body of mail, various applications, etc. The operation unit 1304 includes a numeric keypad 104, function keys 1305a, 1305b, 1305c, and 1305d, a communication end key 1306a, a communication start key 1306b, a pressure-sensitive input unit 1307, etc. The user is allowed to use the operation unit 1304 to input a telephone number or a mail address or to call various functions of the portable telephone device 1300 and input commands associated with called functions. The A/D converters 611 and 613 of the pressure-sensitive input unit 1307 are disposed inside the portable telephone device 1300, and thus they are not shown in FIG. 13.

The portable telephone device 1300 is connected to a base station via a radio link and is capable of communication with another portable telephone device via an exchange connected to the base station.

In the present embodiment, the position sensors 801 and 802 and the pressure sensor 803 are disposed one on another into the multilayer structure such that the pressure sensor 803 for detecting the magnitude of the pressure is placed at the bottom, the position sensor 802 for detecting the movement of the pressed point in the Y direction is placed thereon, and the position sensor 801 for detecting the movement of the pressed point in the X direction is placed at the top. When it is desirable to detect the movement of the pressed point in the Y direction with higher sensitivity than that in the X direction, the position sensor 802 may be placed at the top, the position sensor 801 in the middle, and the pressure sensor 803 at the bottom.

In an central area where the position sensor 801 and the position sensor 802 overlap each other, the thickness is greater than that of the other area where there is no overlap. A recess to accept the thick central part of the sensors 801 and 802 is formed on the case part 1302.

Although in the embodiment described above, the portable telephone device 1300 has only the pressure-sensitive input unit 1307, the portable telephone device 1300 may have an additional pressure-sensitive input unit including a sensor for detecting movement of a pressed point and a sensor for detecting the magnitude of the pressure.

The present invention has been described above with reference to specific embodiments. Note that the present invention is not limited to the details of the embodiments described above, but various modifications are possible without departing from the spirit and the scope of the invention.

What is claimed is:

1. A pointing device operated by an operating object, comprising:
   a light emitting unit which emits light to illuminate the operating object;
   a window having two pairs of arms extending from a central region, the arms in each pair extending in opposite directions to an outer limit of a peripheral area surrounding the window, thereby dividing the peripheral area into a plurality of compartmental areas separated by the window;
   a movement detector which detects movement of the operating object based on light reflected from the operating object and passing through the window;
   a pressure detector including a plurality of detecting sections, each of the detecting sections disposed in one of the compartmental areas to detect a magnitude of a pressure of the operating object; and
   a controller which moves a target object in a direction which is determined in accordance with the movement of the operating object at a speed which is determined in accordance with the magnitude of the pressure detected by at least one of the detecting sections when the operating object is moving.

2. An inputting method comprising:
   detecting movement of an operating object based on light reflected from the operating object and passing through a window having two pairs of arms extending from a central region, the arms in each pair extending in opposite directions to an outer limit of a peripheral area surrounding the window, thereby dividing the peripheral area into a plurality of compartmental areas separated by the window;
   detecting a magnitude of a pressure of the operating object by at least one of a plurality of detecting sections, each of the detecting sections disposed in one of the compartmental areas; and
   moving a target object in a direction which is determined in accordance with the movement of the operating object at a speed which is determined in accordance with the magnitude of the pressure detected by at least one of the detecting sections when the operating object is moving.

3. A computer readable storage medium storing an inputting program causing a computer to execute a process comprising:
   detecting movement of an operating object based on light reflected from the operating object and passing through a window having two pairs of arms extending from a central region, the arms in each pair extending in opposite directions to an outer limit of a peripheral area surrounding the window, thereby dividing the peripheral area into a plurality of compartmental areas separated by the window;
   detecting a magnitude of a pressure of the operating object by at least one of a plurality of detecting sections, each of the detecting sections disposed in one of the compartmental areas; and
   moving a target object in a direction which is determined in accordance with the movement of the operating object at a speed which is determined in accordance with the magnitude of the pressure detected by at least one of the detecting sections when the operating object is moving.

4. The pointing device according to claim 1, wherein the controller determines an operation by the operating object when more than one of the detecting sections detect the magnitude of the pressure is larger than a predetermined value.

5. The pointing device according to claim 1, further comprising a power controller which stops supplying electric power to the light emitting unit when the pressure detected by any of the detecting sections is smaller than a predetermined value for a predetermined period.

* * * * *